March 30, 1965
L. W. BETHKE
3,176,210
BATTERY CHARGER WITH INDEPENDENT REFERENCE SOURCE OF VOLTAGE
Filed June 8, 1961
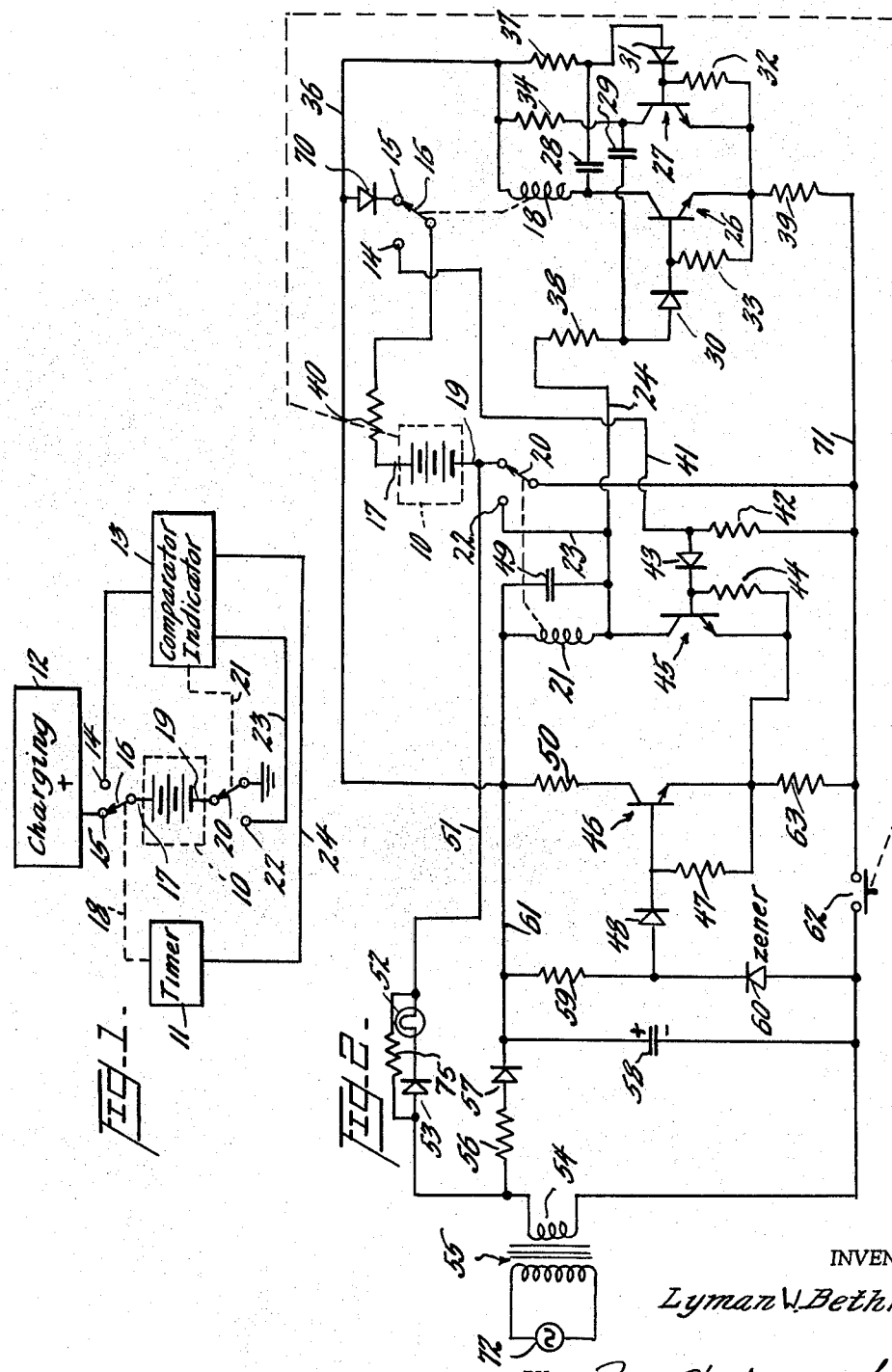
INVENTOR
*Lyman W. Bethke,*
BY *Paris, Haskell and Levine*
ATTORNEYS

United States Patent Office 3,176,210
Patented Mar. 30, 1965

3,176,210
BATTERY CHARGER WITH INDEPENDENT
REFERENCE SOURCE OF VOLTAGE
Lyman W. Bethke, Trenton, N.J., assignor, by mesne
assignments, to United Aircraft Corporation, a corporation of Delaware
Filed June 8, 1961, Ser. No. 115,712
16 Claims. (Cl. 320—40)

This invention generally relates to charging apparatus for electrical rechargeable batteries and more particularly to automatic charging apparatus for small portable batteries of the type commonly employed for portable radio transmitters, radio receivers, and other electrically operated appliances.

In many different types of rechargeable batteries, such as nickel cadmium cells, for example, that are presently in use for powering miniature, portable radio apparatus, care must be exercised in recharging the batteries since an overly prolonged application of reverse charging current thereto may be harmful and permanently destructive to the cells.

At the same time, many of the persons using such portable equipment and appliances are generally not technically trained and are consequently unfamiliar with the characteristics of batteries, electrical charging devices and meters and for this reason conventional charging apparatus of types presently available is unsuitable for such use. Accordingly, a need exists for an automatic charging apparatus for such batteries that will enable unskilled persons to merely insert the battery into the apparatus whereupon the apparatus will automatically function to recharge the battery to its properly charged condition and then automatically terminate its operation requiring no supervision, skill or judgment on the part of the user other than the mere insertion and removal of the battery from the charging equipment.

In addition to these functional requirements, it is also desired that this automatic battery charging apparatus be compatible with the miniature batteries and appliances with which it is to be employed and therefore be small, compact, inexpensive and yet sufficiently reliable and dependable for use over and over again during the life cycle of the battery powered electronic and electrical equipment and appliances with which it is to be used.

According to the present invention, there is provided an electronic charging device meeting these requirements that is both fully automatic in operation yet is both small in size and weight and possesses a minimum number of operating components; comprising in one preferred form but four transistors and associated circuit components together with two miniature relays. According to the invention, the perferred device includes an automatic timing circuit, a charging circuit and a battery monitoring circuit which together function to incrementally charge the battery in a series of discrete steps or cycles and incrementally monitor the battery potential after each charging step to insure that the battery does not receive an overcharge. When the monitoring means determines that the battery is fully recharged, the charging increments are automatically terminated and the device is thereafter disabled from further functioning until the battery is removed. Upon removal of the charged battery, however, the device is automatically reset and conditioned for further use that may be initiated merely by reinsertion of a new battery to be charged, whereby the preferred device requires no adjustment, monitoring or other care by the user and may be operated by one having no knowledge whatsoever of its contents or mode of operation.

It is accordingly a principal object of the invention to provide an automatically controlled apparatus for charging a battery to its correct operating condition without the need for manual supervision or adjustment.

A further object is to provide a highly dependable electronic apparatus for this purpose.

A still further object is to provide such an apparatus that periodically monitors the charge condition of the battery to insure that the battery is never overcharged.

Still another object of the invention is to provide such an apparatus that is small and lightweight for easy portability, and relatively inexpensive.

Other objects and many additional advantages will be more readily comprehended by those skilled in the art after a detailed consideration of the following specification taken with the accompanying drawings, wherein:

FIG. 1 is a block diagram illustrating the operation of one preferred embodiment of the invention, and FIG. 2 is an electrical schematic circuit diagram illustrating circuit details of the preferred embodiment of FIG. 1.

Referring to the drawings, there is generally shown in FIG. 1 the three functional components of an automatic recharging apparatus incorporating the invention, for intermittently charging the battery 10 in a series of incremental steps and measuring the potential of the battery 10 after each of the charging increments. As shown, the three functional components comprise a timer circuit 11 for cyclically switching the upper terminal 17 of the battery 10 to a direct current charging source of potential 12 to receive an increment of charge and then to a comparator-indicator circuit 13 for measuring a potential of the battery 10 after receiving each incremental charge.

As shown, the timer mechanism 11 includes a movable relay contact 16 being electrically connected to the upper terminal 17 of the battery 10 and a pair of fixed contacts 14 and 15; with contact 14 being connected to the comparator-indicator circuit 13, and contact 15 being connected to the direct current charging source 12.

The movable contact 16 of the relay is actuated by the timer mechanism 11 as indicated by dotted line 18 whereby the contact 16 is alternately switched between the movable contacts 14 and 15. The relative time intervals that the movable contact 16 engages and dwells on each of the fixed contacts 14 and 15 is made variable and controlled by the timer mechanism 11 whereby the battery charging portion of the cycle may be made considerably longer than the voltage measuring portion of the cycle which may be performed very rapidly.

The lower terminal 19 of the battery 10 is connected to the right hand fixed terminal of a second relay having a grounded movable contact 20 being actuated by the comparator-indicator mechanism 13, as indicated by dotted line 21 whereby the movable contact 20 is adapted to travel between the fixed contact 19 and a second fixed contact 22, which as shown is electrically connected to the comparator-indicator mechanism 13. When the movable contact 20 engages the battery contact 19, the lower terminal of the battery is grounded enabling the charging current to be passed through the battery whereas when the movable contact 20 is engaged to fixed contact 22, the charging circuit through the battery is disabled.

In operation, the insertion of the battery 10 into a housing (not shown) initiates the operation of the timer device 11 thereby to initially switch the movable relay contact 16 to engage the contact 15 and thereby connect the upper terminal 17 of the battery to the direct current charging power supply 12, as shown. The battery lower contact 19 is normally connected to ground through movable contact 20, as shown, whereby a direct current charging current is applied to the battery 10 for a time duration being controlled by the timer 11. According to one embodiment of the invention for charging a small nickel cadmium battery of about 16 volts, the charging half cycle of the timer is controlled for a duration of about two and one-half to three minutes and the voltage measuring half cycle is controlled for a much shorter time of about two seconds as is necessary to measure the potential of the battery 10. After receiving a fixed duration charging increment, the upper terminal 17 of the battery 10 is switched to the comparator-indicator 13 by the time mechanism 11 for the very short time interval just sufficient to make the necessary measurement of the battery potential. If the battery potential indicates less than a fully charged condition, the continued functioning of the cyclic timer 11 returns the movable contact 16 to the charging terminal 15 to again apply a direct charging current to the battery for the predetermined time interval after which the battery upper terminal 17 is again connected to the comparator-indicator 13 to determine whether the battery has become fully charged. This cycling operation is repeated until the battery has obtained a full measure of charge as determined by its potential reaching a predetermined voltage level. Upon the comparator-indicator 13 determining that the battery has become fully charged, the comparator 13 then actuates the lower movable relay contact 20 to disconnect the lower terminal 19 of the battery 10 from the ground connection and thereby prevent further charging of the battery 10. Actuation of the contact 20 to engage fixed contact 22 also energizes the circuits to maintain the movable relay contact 20 on the fixed contact 22 for preventing further charging of the battery 10 and deactivates the timer mechanism 11 to prevent further cycling of the upper movable relay contact 16.

Briefly recapitulating the operation of the automatic charging circuit as described, the timer circuit 11 actuates the upper movable relay contact 16 over line 18 to connect the upper terminal of the battery 17 to the charging power supply 12 for receiving an incremental charge therefrom and then connects the upper terminal 17 of the battery to the comparator-indicator mechanism 13 for measuring whether the potential of the battery has reached a predetermined level. If after each incremental charge, the battery has not obtained its full measure of charge, the timer mechanism 11 then automatically repeats this cycle of operations. This sequence of operations is thus repeated until the battery potential has been raised to its full charged level whereupon the comparator-indicator mechanism 13 functions to detect this condition and actuates the movable contact 20 of the lower relay to disconnect the lower terminal 19 of the battery from ground and prevent further charging of the battery. A holding and disabling connection over line 23 is also provided to maintain the lower terminal 19 of the battery 10 disconnected from ground to prevent any further current from flowing to or from the battery 10 and the timer mechanism 11 is disabled after the battery has become fully charged thereby to prevent further unnecessary cycling of the upper movable relay contact 16.

Referring now to FIG. 2 for a detailed consideration of preferred circuits for performing the functions described above, the timer mechanism, at the right in FIG. 2, generally comprises a pair of transistors 26 and 27 connected in mutual feedback relationship to provide a free-running type of multi-vibrator. The collector electrode of transistor 26 is connected in feedback through a timing capacitor 28 and a diode 31 to the base electrode of transistor 27 and in a similar manner the collector electrode of transistor 27 is connected through a capacitor 29 and a diode 30 to the base electrode of transistor 26.

The transistors 26 and 27 are preferably of the silicon type for temperature stability and therefore the diodes 30 and 31 are provided in the feedback circuits thereof to prevent a negative potential from being applied to the base electrodes of these transistors.

The collector electrode of transistor 26 is connected through a relay coil 18 to a positive source of potential over line 36 and the collector electrode of transistor 27 is connected to the positive potential line 36 through a resistor 34. For biasing the transistor 27, the positive potential line 36 also energizes the base electrode thereof through a resistor 37 and diode 31 and the emitter electrode is connected to the base through a resistor 32 whereby the base electrode of transistor 27 is biased by a positive potential with respect to the emitter electrode thereof.

The base electrode of transistor 26 is likewise connected to its emitter electrode thereof by means of a biasing resistor 33 and the diode 30 in this circuit is further connected through a resistor 38 to be energized by a source of positive potential over line 61, as will be discussed more fully hereafter.

In operation, the time constant of the multivibrator circuit in each of its two conducting conditions is controlled by the resistance-capacity components connecting the transistors in feedback relationship as is well known in the art. Therefore, the relative time intervals during which each of the transistors 26 and 27 conduct current during their respective half cycles is predetermined according to the desired incremental charging time interval and measuring time interval as is desired. The emitter electrodes of both transistors 26 and 27 are commonly connected to ground line 71 through a resistor 39.

During operation, as the transistor 27 conducts current during one half cycle, the relay coil 18 is deenergized and the movable contact 16 is normally in engagement with fixed contact 15 leading to the charging circuit. Charging current is therefore applied from the direct current charging line 36 and through a blocking diode 70 and a current limiting resistor 40 to the upper positive terminal 17 of the battery 10. The lower terminal 19 of the battery is normally connected through movable contact 20 of the second relay to the common ground connection on line 71. Thus, during conduction of the transistor 27, an incremental charge of direct current is passed through the battery 10 as is desired.

During the second half cycle of operation of the multivibrator, the transistor 26 is made conducting and the transistor 27 nonconducting. As transistor 26 is rendered conducting, the current flows through relay coil 18 whereby the movable relay contact 16 is positioned to engage a fixed contact 14 thereby connecting the upper terminal of the battery 10 over line 41 to the input of the voltage comparator circuit 13.

The voltage comparator circuit generally comprises a pair of transistors 45 and 46 connected differentially, with their emitter elements being connected in common to ground 71 through a resistor 63 and with the collector element of transistor 46 being connected to the positive source of potential on line 61 through a resistance 50 and with the collector element of transistor 45 being positively energized from line 61 through a relay winding 21 being shunted by a capacitor 49. One input to the differential or comparator circuit, being directed over line 41, is introduced through a diode 43 leading to the base electrode of transistor 45 and a second input to the comparator circuit is directed through a diode 48 leading to the base electrode of the second transistor 46.

As is known in the art, the resistor 63 being connected in common in the emitter electrode circuits of both transistors, functions as a common feedback resistor to both transistors whereby current flow through either one of the transistors provides a voltage across the resistor 63 in a direction to negatively bias the other transistor and reduce current flow therethrough. Consequently, if the potential introduced at the base of transistor 46 is greater than the potential introduced at the base electrode of transistor 45, an increased current will flow through transistor 46 and a decreased current or cutoff condition will exist in transistor 45. Similarly, if the potential introduced at the base electrode of transistor 45 exceeds the potential being introduced at the base electrode of transistor 46, the opposite condition will prevail whereby an increased current will flow through transistor 45 and a reduced current will flow through transistor 46.

As discussed above, during the second half cycle of the timing circuit, the upper terminal 17 of the battery 10 is connected over line 41 to energize the base electrode of transistor 45. The base electrode of transistor 46 on the other hand is adapted to be energized by a standard or fixed potential from a power supply as will be discussed in more detail hereafter. Consequently, during this second half cycle of the timer, if the potential on the battery 10 exceeds the potential of the standard voltage, increased current flows through transistor 45 and a decreased current flows through transistor 46. The increased current through transistor 45 passes through relay winding 21 thereby energizing this relay 21 to actuate its movable contact 20 into engagement with fixed terminal 22. This action occurs when the potential of the battery 10 has reached a predetermined value indicating that the battery 10 has been fully charged to its desired operating condition. Upon the movable contact 20 leaving the fixed contact 19 and engaging contact 22, the lower terminal of the battery 10 is disconnected from the ground connection on line 71 and instead the collector element of transistor 45 is connected to the ground terminal 71 over line 23 and through fixed contact 22 and movable contact 20 of the relay. Since the upper terminal of the relay 21 is energized over line 61 by a direct current potential, the connection of its lower terminal and the collector of transistor 45 to ground enables current to continuously flow through the relay winding 21 thereby to lock or maintain the relay 21 in its energized condition. Thus, upon the comparator circuit determining that battery 10 has become fully charged, the battery 10 is thereupon disconnected from the ground connection 71 to prevent further charging of the battery and the relay 21 controlling this connection is locked or maintained in this condition.

Additionally, the switching of movable contact 20 to fixed contact 22 serves to connect line 24 leading from the timer circuit to the ground terminal 71. Line 24 is normally connected from the positive potential line 61 through relay coil 21 and through resistor 38 and diode 30 to the base electrode of transistor 26 to provide the direct current biasing of the base electrode of the timer transistor 26. Consequently, upon line 24 being switched to ground, the base electrode of transistor 26 is effectively grounded to disable operation of the timer multivibrator with transistor 27 thereof being rendered conducting and transistor 26 thereof being rendered nonconducting. Thus, when the battery 10 receives its full measure of charge, the comparator circuit detects this condition and operates relay 21 to both disconnect the battery 10 from receiving any further charge and also disables the timing circuit from further cycling thereby to prevent unnecessary switching of the relay contact 16 as is desired.

Thereafter, the circuit remains in this disabled condition by the locked relay 21 until the battery 10 is removed from the charging circuit. By removing the battery from the charging circuit, a microswitch 62 being located in the ground line 71 is opened to deenergize the relay coil 21. Upon current flow through relay 21 being discontinued, its movable contact 20 is returned to engage fixed contact 19 thereby restoring the charging apparatus to its initial condition in preparation for receiving a different uncharged battery 10.

The power supply for providing the direct current charging potential for the battery 10, and for supplying the direct current potential for the timing circuit 11 and the comparator circuit 13 is preferably provided by a half wave rectifier circuit including a power transformer 55 whose secondary winding 54 energizes a current limiting resistor 56 and a rectifying diode 57 thereby to provide a direct current potential across a filtering capacitor 58 being connected from the ground line 71 to the direct current energizing line 61. As discussed above direct current line 61 is connected to energize transistors 45 and 46 and is connected to line 36 that energizes transistors 26 and 27.

To provide a voltage standard that is stabilized at a given fixed potential, for energizing the base electrode of transistor 46 in the comparator circuit, there is provided a potential divider including a resistor 59 and a Zener diode 60 connected in series between the direct current potential on 61 and the ground line 71. As is well known to those skilled in the art, the potential being developed across the Zener diode 60 is maintained at a highly stabilized fixed value regardless of variation of the potential from the power supply over line 61. Consequently, this stabilized potential across the Zener diode is supplied through the protecting diode 48 to the base electrode of transistor 46 in the comparator circuit to provide the fixed voltage reference for comparison with the potential of the battery 10.

For the purpose of providing an indication of the time during which the battery 10 is being charged and indicating when the battery 10 has become fully charged, there is provided an indicating lamp 52 in series with a diode rectifier 53 and being connected between the lower terminal 19 of the battery and the secondary winding 54 of the power supply transformer. As will be recalled, during the time interval that the battery 10 is being incrementally charged, the lower fixed terminal 19 thereof is connected through movable contact 20 to the ground connection 71 whereby electrical current may flow through the diode 53 and lamp 52 to the ground line 71 to indicate that the battery 10 is being charged. When the charging of the battery 10 has been completed and the battery is fully charged to its desired operating voltage, the movable relay contact 20 is then switched to engage the fixed terminal 22 and thereby disconnect the battery terminal 19 from the ground connection. When this latter connection to the ground line 71 is broken, electrical current cannot flow through the indicator lamp 52 whereby the indicating lamp 52 is extinguished to signal the operator that electrical charging of the battery 10 has been completed. The function of the rectifying diode 53 in this circuit is to prevent discharge of the battery 10 backwardly through the indicator lamp 52 after the charging of the battery has been completed. Similarly, the diode 70 being connected to the upper terminal 17 of the battery 10 through relay contacts 15 and 16 performs the same function, preventing the discharge of the battery 10 onto line 36. Thus, after the charging of the battery 10 has been completed and the battery potential has been raised to its desired operating level, the complete charging circuit and timing circuit are disabled and the battery 10 is prevented from discharging through any of these circuits by means of the diodes 53 and 70 being connected to the opposite terminals thereof. Additionally, the extinguishing of the indicator lamp 52 signals to the operator of the equipment that the battery 10 has been fully charged to its desired condition and may thereafter be removed from the charging apparatus.

As noted above, after the battery has been removed from the charging apparatus, a switch 62 is actuated to open circuit in ground line 71 thereby preventing any current flow through any of the transistors or relays in the circuit, thereby permitting the movable contacts of the relays to return to their initial condition and resetting the circuitry for a new cycle of operation. Upon later insertion of a battery 10 to be charged, the switch 62 is actuated to close the circuit connecting the ground line 71 to the lower terminal of the secondary winding 54 of the power transformer 55 thereby conditioning the charging apparatus for a new cycle of operations.

It is to be noted that each of the four transistors employed in the preferred circuit is provided with a diode 30, 31, 43, and 48 in series with each of the base electrodes thereof. The purpose of these diodes is to prevent any negative potential from being applied to the base electrodes since the transistors employed in the circuit are preferably of the silicon variety for temperature stability purposes and the application of a negative potential to the base electrodes thereof might injure or otherwise interfere with the proper functioning of these transistors.

As an additional feature of the invention, there is provided a means for continuously trickle charging the battery 10 so long as it remains in the battery charging apparatus thereby to continuously maintain the battery at its fully charged potential level despite leakage. As shown in FIG. 2, this trickle charging function is performed by the addition of a single high resistance 75 placed in shunt across the diode 53 and lamp indicator 52. As will be recalled from the above, after the main charging of the battery 10 has been completed, the multivibrator circuit is disabled and the relay contact 16 engages the fixed contact 15 to connect the battery positive terminal 17 to the direct current power line 36 through the current limiting resistor 40 and diode 70. The battery negative terminal 19, on the other hand is ungrounded and connected over line 51 to the resistor 75 and thence to the upper terminal of the transformer secondary winding 54 due to the fact that the second relay contact 20 is engaging the fixed contact 22. Consequently, at each alternate half cycle of the alternating current source 72 when the upper terminal of the secondary winding 54 becomes negative, current flows from the direct current power line 36 and through diode 70, resistor 40, battery 10, and resistor 75 to the negative going upper terminal of transformer winding 54 to provided a pulse of trickle charging current through the battery 10. Since resistance 75 is made large, these half cycle trickle pulses are controlled in amplitude to merely maintain the potential of the battery at its desired level.

Although but one preferred embodiment of the invention has been illustrated and described, it is believed evident that any changes may be made by those skilled in the art without departing from the spirit and scope of this invention. Accordingly, this invention is to be considered as being limited only according to the following claims appended hereto.

What is claimed is:

1. In an automatic electronic charging apparatus for electrical batteries, means for conveying a direct current charging potential, means providing an independent source of constant reference voltage, a voltage level determining means, energizable by said reference source of voltage, and cyclically operating electronic oscillator means for periodically connecting said battery to said conveying means for receiving an incremental charge and alternately connecting said battery to said voltage level determining means to compare the battery voltage with said reference voltage, said determining means being responsive to the battery voltage reaching said reference for disabling said conveying means, thereby to prevent overcharge of said battery.

2. In the apparatus of claim 1, an indicator means for said charging apparatus, and means connecting said indicator means for providing a first continuous indication condition when said battery is being charged and a second continuous condition when said battery is fully charged.

3. In the apparatus of claim 1, means interconnecting said oscillator means and voltage level determining means whereby said oscillator means is also disabled from further operation when the battery voltage reaches said reference voltage.

4. In the apparatus of claim 1, said cyclically operating means comprising a transistor multivibrator and said conveying means including a relay having an energizable coil being energized by said multivibrator when said multivibrator is in one given conducting condition thereof.

5. In the apparatus of claim 1, said conveying means including a relay that is periodically energized and de-energized by said oscillator means for selectively connecting and disconnecting said battery to said conveying means and determining means, and said determining means including a relay being energized upon said battery reaching said predetermined voltage level to disable further incremental charging of said battery and to disable said oscillator means.

6. In the apparatus of claim 1, said cyclically operating means comprising a transistor multivibrator having a pair of transistors connected in mutual feedback relationship, and said voltage level determining means being interconnected with said multivibrator to disable said multivibrator upon said battery voltage reaching said reference voltage.

7. In an automatic electronic charging apparatus for electrical batteries, a charging circuit, a cyclic electronic timer means, means providing an independent reference source of potential, and a voltage detector means energizable by said reference source of potential, said cyclic timer means repetitively interconnecting said battery first to said charging circuit for a fixed time interval and then disconnecting said charging circuit and connecting said battery to said detector for a brief interval to compare the battery potential to said reference source of potential, and said detector means disabling said charging circuit and timer means upon the battery potential reaching a predetermined level.

8. In the apparatus of claim 7, a resetting means for said automatic charging apparatus, said resetting means including a switch being actuated by the insertion of the battery into the charging apparatus for continuously applying power from a source to the apparatus so long as the battery is inserted and being deactivated upon removal of the battery to remove power from the source.

9. In the apparatus of claim 7, said timer means including a multivibrator circuit and a relay being periodically energized by the multivibrator, and said detector means including a relay that is energized upon the battery voltage reaching a predetermined level to both disconnect said charging circuit and bias said multivibrator into a static condition.

10. In the apparatus of claim 9, an indicator means being connected to said battery and being continuously energized before said battery is fully charged and de-energized when said detector relay disconnects said charging circuit.

11. A charging apparatus for rechargeable batteries comprising: an electronic oscillator, means controlled by said oscillator, for periodically applying incremental charges to the battery during alternate half cycles of said oscillator, means controlled by said oscillator including an independent reference source of potential for periodically comparing the potential of the battery with said reference source and determining if the battery has attained a given condition of charge during other alternate half cycles of said oscillator, means responsive to said determining means for disabling the incremental charging means when the battery potential reaches a predetermined voltage, and automatically operating means responsive to said determining means for applying a trickle charge to said battery after said incremental charging means is disabled.

12. A charging apparatus for rechargeable batteries comprising charging means for applying a series of discrete incremental charges to the battery, incrementally operating measuring means alternately energized between incremental charges to determine if the battery has attained a given level of charge condition during the previous increment, and an indicator means providing a first continuous indication during both the series of incremental charges and incremental measurements and a second indication after the battery has become charged to a given level.

13. An electronically controlled charging apparatus for batteries comprising a charge applying circuit, an oscillator circuit, switch means controlled by said oscillator for periodically connecting said battery to said charge applying circuit, a comparator circuit energizable by a reference source of potential, said switch means responsive to said oscillator after each periodic connection to the charge applying circuit for connecting the battery to the comparator circuit, said comparator circuit including a second switch means actuated upon said battery potential attaining the potential of said reference source to disable said charge applying circuit, an indicator means providing a first continuous indication before said battery attains the potential of the reference source, and being conditioned by said comparator circuit to provide a second continuous indication after said battery attains the potential of the reference source, and a trickle charging means for applying a low current trickle charge to said battery after it has attained the potential of said reference source.

14. In a battery charging circuit, an electronic voltage level detecting means energizable by a reference source of potential, first switching means controlled by said detecting means when the battery attains a given voltage proportion to the reference source, a charging circuit for said battery, an electronic oscillator, a second switching means energized by said oscillator to alternately connect said battery to said charging means and then to said detecting means during each cycle of said oscillator, an indicator, and said first switching disabling said charging means and controlling said indicator to provide a different indication after said battery has attained said given voltage.

15. In a battery charging apparatus, a charging circuit for the battery, a voltage level detecting circuit, a first relay being periodically energized to alternately connect the battery to the charging circuit and detecting circuit, a second relay operated by said detecting circuit for disabling said first relay when the battery voltage attains a predetermined level to prevent further connection of the battery to the charging circuit, said second relay having holding contacts to maintain the second relay in said operated condition, and a disconnect switching means actuated by the insertion of the battery into the apparatus for conditioning the circuits for operation and by the removal of the battery for resetting the second relay.

16. In an automatic battery charging apparatus, switch means actuated by insertion of the battery into the apparatus for applying power thereto and by the removal of the battery from the apparatus for removing the power, a charging circuit including disconnect control means for charging the battery to a preset condition and then discontinuing the charging thereof while unaffecting the application of power to the apparatus controlled by the switch means, said switch means being interconnected with said disconnect control means to reset the control means when the battery is removed from the apparatus and trickle charging means automatically responsive to said disconnect means for applying a trickle charge to said battery after said charging means is discontinued.

References Cited by the Examiner

UNITED STATES PATENTS

| | | | |
|---|---|---|---|
| 920,103 | 4/09 | Case | 320—48 X |
| 1,710,542 | 4/29 | Landis | 320—38 X |
| 1,885,908 | 11/32 | Gilson | 320—22 X |
| 2,334,289 | 11/43 | Richards | 320—38 X |
| 2,372,698 | 4/45 | Whitesell | 320—38 X |
| 2,885,623 | 5/59 | Staufenberg | 320—45 |

LLOYD McCOLLUM, *Primary Examiner.*
ROBERT L. SIMS, *Examiner.*